Figure 1:
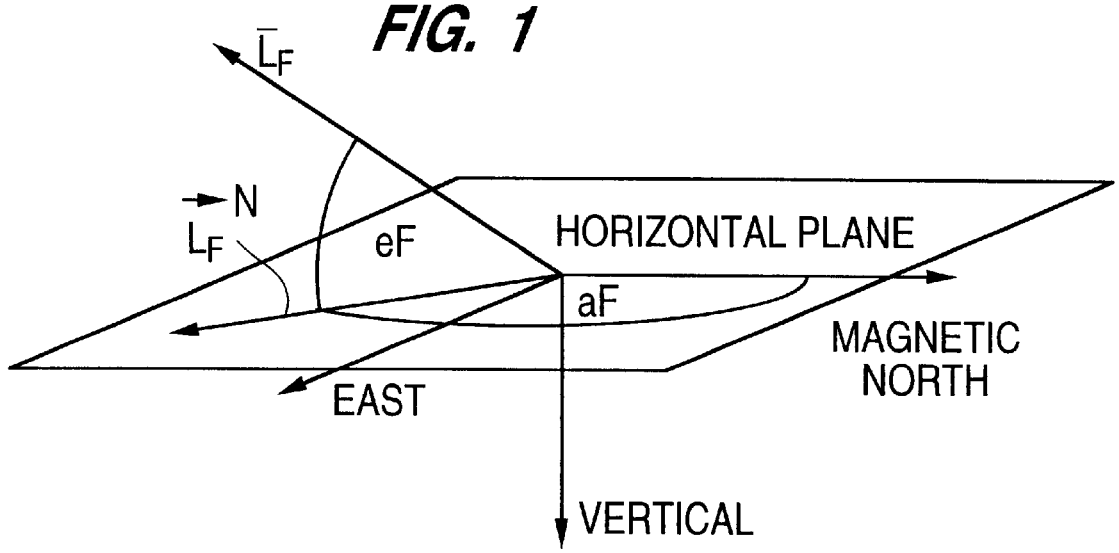

United States Patent
Nachbaur et al.

[11] Patent Number: 5,946,813
[45] Date of Patent: Sep. 7, 1999

[54] METHOD AND DEVICE FOR DETERMINING CORRECTION PARAMETERS

[75] Inventors: Peter Nachbaur, Feldkirch, Austria; Silvio Gnepf, Heerbrugg; Frank Dittrich, Rebstein, both of Switzerland

[73] Assignee: Leica Geosystems AG, Heerbrugg, Switzerland

[21] Appl. No.: 09/170,206

[22] Filed: Oct. 13, 1998

Related U.S. Application Data

[63] Continuation of application No. PCT/EP98/00627, Feb. 5, 1998.

[30] Foreign Application Priority Data

Feb. 10, 1997 [DE] Germany ............... 197 04 853

[51] Int. Cl.$^6$ ............................................. G01C 17/38
[52] U.S. Cl. ................................. 033/357; 701/214
[58] Field of Search ........................ 33/355 R, 356, 33/357, 358, 359, 361; 73/178 R; 701/207, 213, 214

[56] References Cited

U.S. PATENT DOCUMENTS

| | | |
|---|---|---|
| 4,725,957 | 2/1988 | Alberter et al. ............ 33/356 |
| 4,733,179 | 3/1988 | Bauer et al. ............... 33/356 |
| 4,989,333 | 2/1991 | Helldörfer et al. .......... 33/357 |
| 5,349,529 | 9/1994 | Masumoto et al. .......... 33/357 |
| 5,796,613 | 8/1998 | Kato et al. ............... 701/214 |
| 5,852,791 | 12/1998 | Sato et al. .............. 701/207 |
| 5,856,802 | 1/1999 | Ura et al. ............... 701/214 |

*Primary Examiner*—G. Bradley Bennett
*Attorney, Agent, or Firm*—Foley & Lardner

[57] ABSTRACT

The invention relates to a method for determining correction parameters for the measured values of a magnetic compass, which is built into a land craft for navigation purposes, and gives the azimuth a of the direction of motion of the vehicle; of a gradiometer giving the elevation e of the direction of motion of the vehicle in relation to the horizon; and of an odometer, giving the distance s travelled. In this method, two visually navigated test drives are carried out in different directions between known point of departure and arrival. The measured values (a, e, s) are replaced by corrected values (a', e', s') in accordance with the following: a'=a+A+B·sin a+C·cos a; e'=e−$A_2$; S'=ρ. The correction parameters are determined by performing a vertorial comparison of the known direction and distance values (a', e', s') with the measured values. The correction parameters are as follows: A for declination and compass mounting errors in azimuth; B, C for hard and soft magnetic vehicle magnetism; $A_2$ for mounting errors of the gradiometer in elevation; and ρ for a scale error of the odometer.

4 Claims, 1 Drawing Sheet

METHOD AND DEVICE FOR DETERMINING CORRECTION PARAMETERS

The benefit is hereby claimed of the right to an earlier effective filing date based on PCT/EP98/00627 as provided for in 35 USC § 120, filed Feb. 5, 1998.

The invention relates to a method for determining correction parameters.

During the navigation of a land vehicle using an electronic compass for displaying the azimuth, a gradiometer for indicating the elevation or height, and an odometer for indicating distance, errors occur in the calculated position. The reasons for this are

- the difference between magnetic north and map north of the map respectively used for the navigation,
- the geometrical difference between the mounting direction of the compass or gradiometer and the direction of motion of the vehicle,
- soft and hard magnetic effects by the vehicle on the compass, and
- scaling errors in the distance measurement using the odometer.

For navigation, it is necessary to have the direction of motion of the vehicle, expressed in coordinates of the map north system, the latter being additionally rotated horizontally by the declination relative to the magnetic north system. The declination can be found from tables. However, it additionally has a superimposed rotation of the compass coordinate system relative to the direction of motion of the vehicle, the direction of which is not known.

In the case of a land vehicle, the direction of motion of the vehicle is not a priori given by geometrical or optical construction in relation to the vehicle chassis, or easy to calculate from manufacturer specifications. It can only be determined empirically from the difference between the true and calculated direction of motion.

DE 41 25 369 A1 discloses a navigation device which is mounted on a motor vehicle and contains a terrestrial magnetism sensor as its azimuth sensor. In order to compensate for indication errors of this sensor due to the effects of a magnetic environment, comparison with additionally obtained GPS navigation data is provided. However, it is in this way only possible to correct a shift in the origin of the coordinate system.

DE 31 41 439 A1 provides a device for determining the azimuth, in which the vehicle is oriented with the azimuth sensor mounted on it exactly northward and eastward. The deviation then established of two-component measurement signals of the azimuth sensor relative to the specified orientation is compensated for by adjusting the measurement signals using an adjustment circuit. A distortion to the output signals due to residual magnetism of the azimuth sensor is thereby likewise corrected by shifting the origin.

The effects of a magnetic compass' misalignment with the direction of motion and of hard and soft magnetic fields on the accuracy of the indication are known from maritime navigation. In order to compensate for the deviation of the compass, coefficients A, B, C, D and E are defined and each determined separately. In this case, A accounts for a constant indication error, for example due to setting up the compass at an angle to the longitudinal direction of the ship, B accounts for the effect of the longitudinal ship magnetism, C accounts for the effect of the transverse ship magnetism, D accounts for the effect of magnetism induced in soft iron parts and E accounts for an asymmetry in the distribution of ferrous masses in the structure of the ship (A. Heine, Kompass ABC, Verlag Klasing + Co., (1983), pages 43 to 45). Since the effects D and E are generally small, their coefficients are generally neglected.

In order to determine the coefficients, the ship is kept on known courses northward, eastward, southward and westward, and the respective deviation of the compass indication relative to the known courses is read. The individual coefficients are calculated by averaging the deviation values relative to selective courses.

The distance deviations relative to the displacements plotted on the map, which occur in land navigation owing to inaccurate distance measurement and traveling through mountains, are of no relevance to maritime navigation. For autonomous navigation of land vehicles, however, it is necessary to equip them, in addition to the magnetic compass for direction measurement, with an odometer for distance measurement and a gradiometer as well, so that the distances measured when traveling through mountains or valleys can be converted into the values corresponding to the map plane.

In order to calibrate the compass indication, it is customary to drive in circles and take measurements in the plurality of defined angular positions relative to the center of the circle. A correction to the magnetic direction indication for the horizontal plane is also sometimes made using gradient sensors. In a digital magnetic compass (DMC) manufactured by the company Leica AG, Heerbrugg, Switzerland, two gradient sensors for elevation and bank are further integrated in addition to three magnetic field sensors for the three spatial coordinates. The distance measurement, and the vehicle position given thereby in conjunction with the direction measurement, can be checked and, where appropriate, corrected using independently obtained satellite navigation signals (GPS). The direction measurement, the distance measurement and the position measurement are all dealt with by mutually independent systems (information from the company KVH Industries, Inc., U.S.A., (1995), TACNAV System).

The object of the invention is to provide a simple to use method with which, in the case of a land vehicle, correction values can be determined for the indications from the built-in measuring instruments for azimuth, elevation and distance, so that substantially increased accuracy can be achieved in navigation and a GPS check may be obviated.

This object is achieved according to the invention by the features described herein. For the evaluation, it is particularly advantageous if a return journey is made between points known by their geographical coordinates.

The geographical coordinates of the departure point and destination point are expediently determined by a GPS measuring system built into the vehicle. During the test drive, it is, in the case, possible for a GPS coordinate determination to be carried out continuously and for the accuracy of the GPS coordinate values to be determined as a ratio to the distance traveled s, and for the destination point to be established on the basis of this.

The drawing represents the direction of motion of the vehicle as a vector relative to the horizontal plane=map plane.

FIG. 1 illustrating the azimuth and elevation, and

Figure 2:
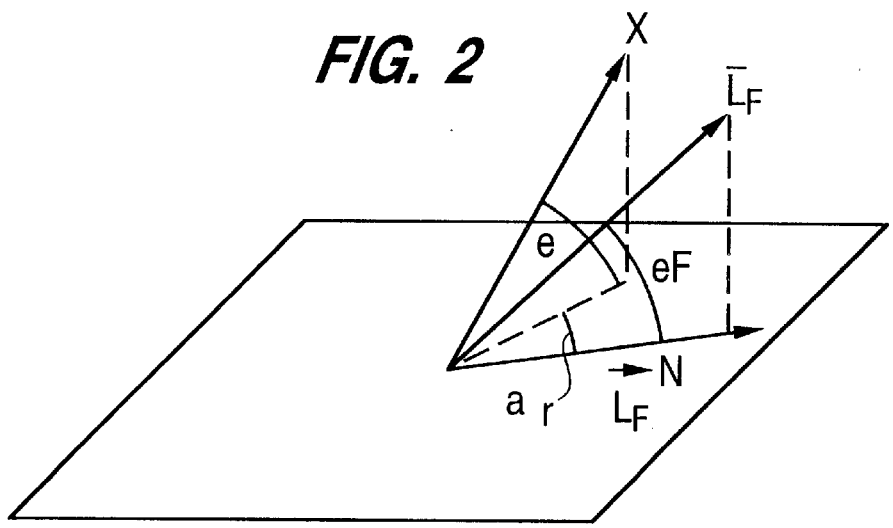

FIG. 2 illustrating the effect of an azimuth error on the elevation indication.

The invention will be explained below with reference to an example, azimuth measurement and elevation measurement being taken in a coupled system (DMC).

The geographical coordinates for the departure point and destination point can be taken from land maps, tables or landmarks, or measured using GPS. The departure point and destination point can moreover be arbitrarily selected, it even being possible for the actual destination point to be establish only on the basis of the way in which the test drive proceeds. At the destination point thus selected, the geographical coordinates are preferably determined using a GPS position measurement. A decision criterion for establishing the destination point may be a sufficiently good ratio between the quality of the GPS coordinate values and the distance covered during the test drive. This ratio may be checked continuously during the test drive.

On the basis of the values for azimuth and elevation, the direction of motion of the vehicle $\overline{L}^N_F$ is represented as a unit vector in the horizontal plane and related to magnetic north. FIG. 1 illustrates the relationship, $e_F$ denoting the elevation angle between the actual direction of motion of the vehicle $\overline{L}_F$ and the horizontal plane, and $a_F$ denoting the azimuthal angle between magnetic north and the projection of $\overline{L}_F$ onto the horizontal plane. Through multiplication by the distance traveled $s_F$, the position in the horizontal plane is given in general representation as $$s_F \cdot \overline{L}^N_F = s_F \begin{pmatrix} \cos e_F \cdot \cos a_F \\ \cos e_F \cdot \sin a_F \\ \sin e_F \end{pmatrix}$$

In practice, the position achieved is determined, starting from a departure point, by a succession of many intermediate values $\overline{L}_j$, $s_j$: j=1 ... N. In maritime navigation, this method is known as coupled navigation. Thus, omitting the indices N and F, the following applies for the position achieved along the direction of motion of the vehicle in the horizontal plane $$\int_0^s \vec{L} ds \approx \sum_{j=1}^N \vec{L}_j \cdot s_j = \sum_{j=1}^N \begin{pmatrix} \cos e_j \cdot \cos a_j \\ \cos e_j \cdot \sin a_j \\ \sin e_j \end{pmatrix} \cdot s_j$$

Other forms of approximate integration are possible and fall within the knowledge of the person skilled in the art.

With the assumption that correct values for elevation e, azimuth a and distance traveled s are available, and the departure point is known, an accurate positional indication can be made by evaluating the indicated sum, or accurate navigation can be carried out by entering values for a and s which are taken from the map. In fact, however, the values given by the measuring instruments are distorted, as mentioned above and represented in FIG. 2.

The elevation e and azimuth a are measured in the coordinate system of the DMC. Its x axis is intended to correspond to the direction of motion of the vehicle. FIG. 2 shows the azimuth shift $\Delta a_F$ of the projection of the direction of motion of the vehicle $\overline{L}_F$ relative to the projection of the x axis, and the difference of the elevation e of the x axis from the elevation $e_F$ in the direction of motion of the vehicle.

According to the invention, the measured values a, e, s are replaced by corrected values a', e', s' as indicated below:

a'=a+A+B·sin a+C·cos a
e'=e−$A_2$
s'=ρ·s

In this case, the parameter

A accounts for the declination relative to magnetic north and a compass mounting error in azimuth, B, C account for a hard and soft magnetic vehicle magnetism, $A_2$ accounts for a mounting error of the gradiometer in elevation, and ρ accounts for a scale error of the odometer.

The unknown correction parameters are determined according to the invention in two visually navigated test drives, in which the correct values a', e' and s' between the departure and destination position are known, and the current values a, e, s are measured. During each test drive, a sufficient number of independent equations for determination are obtained according to the measured values for the three spatial coordinates x, y, z, so that the correction parameters can be uniquely determined and taken into account in the measuring system during subsequent instrument-based navigation journeys.

It is particularly advantageous, in the two test drives, simply to reverse direction. It is then necessary for only two points to be known by their geographical coordinates, and the true path differences equal to zero, so that the system of equations for determination is simplified.

If a vehicle is used only on the level, the use of gradiometers may be omitted. This reduces the number of correction parameters and also simplifies the solution of the equations for determination. This special case clearly does not depart from the scope of the invention. What is essential is the fact that the corrected azimuth can be written in the form given and, in the simplest case, all the correction parameters necessary can be determined with two test drives between two known points.

The entire contents of PCT application number PCT/EP98/00627, filed Feb. 5, 1998, and German application number 197 04 853.6, filed Feb. 10, 1997, are incorporated herein by reference.

We claim:

1. Method for determining correction parameters for the measured values of a magnetic compass, which is built into a land vehicle for navigation purposes, and gives the azimuth a of the direction of motion of the vehicle, of a gradiometer giving the elevation e of the direction of motion of the vehicle in relation to the horizon, and of an odometer giving the distance s traveled, the instantaneous direction vector of the vehicle being given by $$\int_0^s \vec{L} ds \approx \sum_{j=1}^N \vec{L}_j \cdot s_j = \sum_{j=1}^N \begin{pmatrix} \cos e_j \cdot \cos a_j \\ \cos e_j \cdot \sin a_j \\ \sin e_j \end{pmatrix} \cdot s_j$$

where $L_j$=direction of motion of the vehicle in the horizontal plane and $s_j$=distance interval between two measurement instances j and j−1, characterized in that a first test drive is carried out with visual navigation from a departure point known by its geographical coordinates to a destination point also known by its geographical coordinates, in that a subsequent test drive with a change in direction is carried out under visual navigation to a second destination point known by its geographical coordinates, in that, during the test drives, the measured values $a_j$, $e_j$, $s_j$ are recorded at instances $t_j$: j=1 ... N, and the corresponding values $a'_j$, $e'_j$, $s'_j$ are calculated from the known coordinates of the departure point and destination point, and in that the calculated direction vectors are related to the direction vectors determined by measurement according to:

a'=a+A+B·sin a+C·cos a e'=e−$A_2$ s'=ρ·s and the correction parameters

A for declination and compass mounting error in azimuth,

B, C for hard and soft magnetic magnetism in the vehicle, $A_2$ for mounting errors of the gradiometer in elevation, and ρ for a scale error of the odometer are determined therefrom.

2. Method according to claim 1, characterized in that the second test drive takes place from the first destination point back to the departure point.

3. Method according to claim 1, characterized in that the geographical data of the departure point and destination point are determined using a GPS measuring system built into the vehicle.

4. Method according to claim 3, characterized in that, during the test drive, GPS coordinate determinations are carried out continuously and the accuracy of the GPS coordinate values is determined as a ratio to the distance traveled s, and the destination point is established on the basis of the ratio obtained.

* * * * *

UNITED STATES PATENT AND TRADEMARK OFFICE
CERTIFICATE OF CORRECTION

PATENT NO. : 5,948,813
DATED : September 7, 1999
INVENTOR(S) : Henry J. Showell and Elora J. Weringer It is certified that error appears in the above-identified patent and that said Letters Patent is hereby corrected as shown below:

Column 16, line 31, delete "($C_4$-$C_6$) heteroaryl" and insert -- ($C_4$-$C_9$)heteroaryl. --

Column 16, line 35, delete "($C_1$-$C_$)alkyl" and insert -- ($C_1$-$C_6$) alkyl --.

Column 16, line 38, delete "($C_6$-$C_{10}$) aryl" and insert -- ($C_6$-$C_{10}$) aryl --.

Column 16, line 47, delete "($C_3$-$C_6$) cycloalkyl ($C_1$-$C_j$alkyl) and insert -- ($C_3$-$C_7$) cycloalkyl ($C_1$-$C_6$) alkyl --

Column 16, line 48, delete "($C_1$-$C_j$alkyl" and insert -- ($C_1$-$C_6$) alkyl --.

Column 16, line 63, delete "$R^1$" and insert -- $R^{11}$ --

Column 16, line 64, delete "($C_1$-CO)" and insert -- ($C_1$-$C_6$) --.

Column 16, line 66, delete "$RI^5$" and insert -- $R^{15}$ --.

Column 17, line 28, delete "($R^{"5}SO_2$) NH, (R5SCO) NH, ($R"$ $CO_2$)" and insert -- ($R^{15}CO_2$) NH, ($R^{15}CO$) NH, ($R^{15}CO_2$) --.

Signed and Sealed this

Seventh Day of November, 2000

Attest:

Q. TODD DICKINSON

*Attesting Officer*  *Director of Patents and Trademarks*